Figure 1:
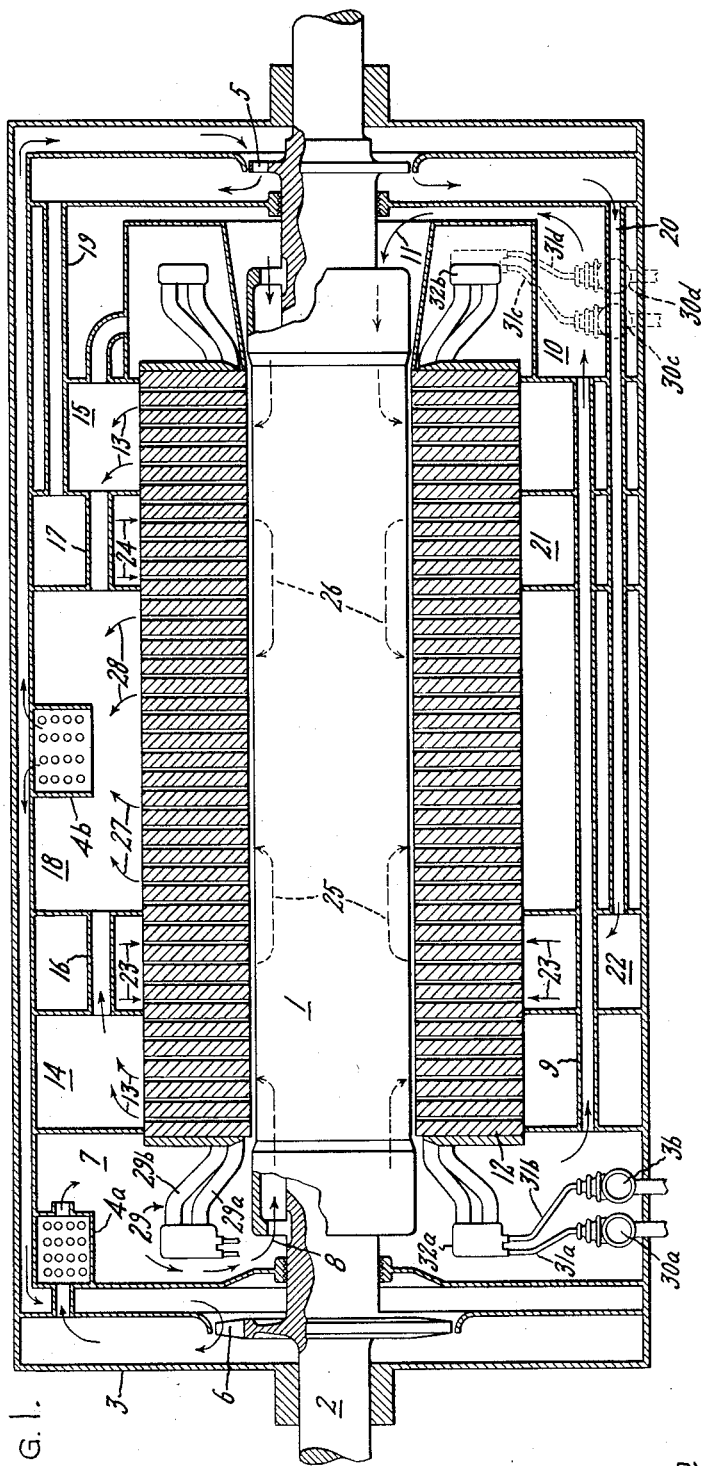

Sept. 12, 1961 E. J. FLYNN 2,999,951
DYNAMOELECTRIC MACHINE COOLING
Filed Feb. 26, 1957 2 Sheets-Sheet 1

INVENTOR.
EDWARD J. FLYNN
BY
HIS ATTORNEY

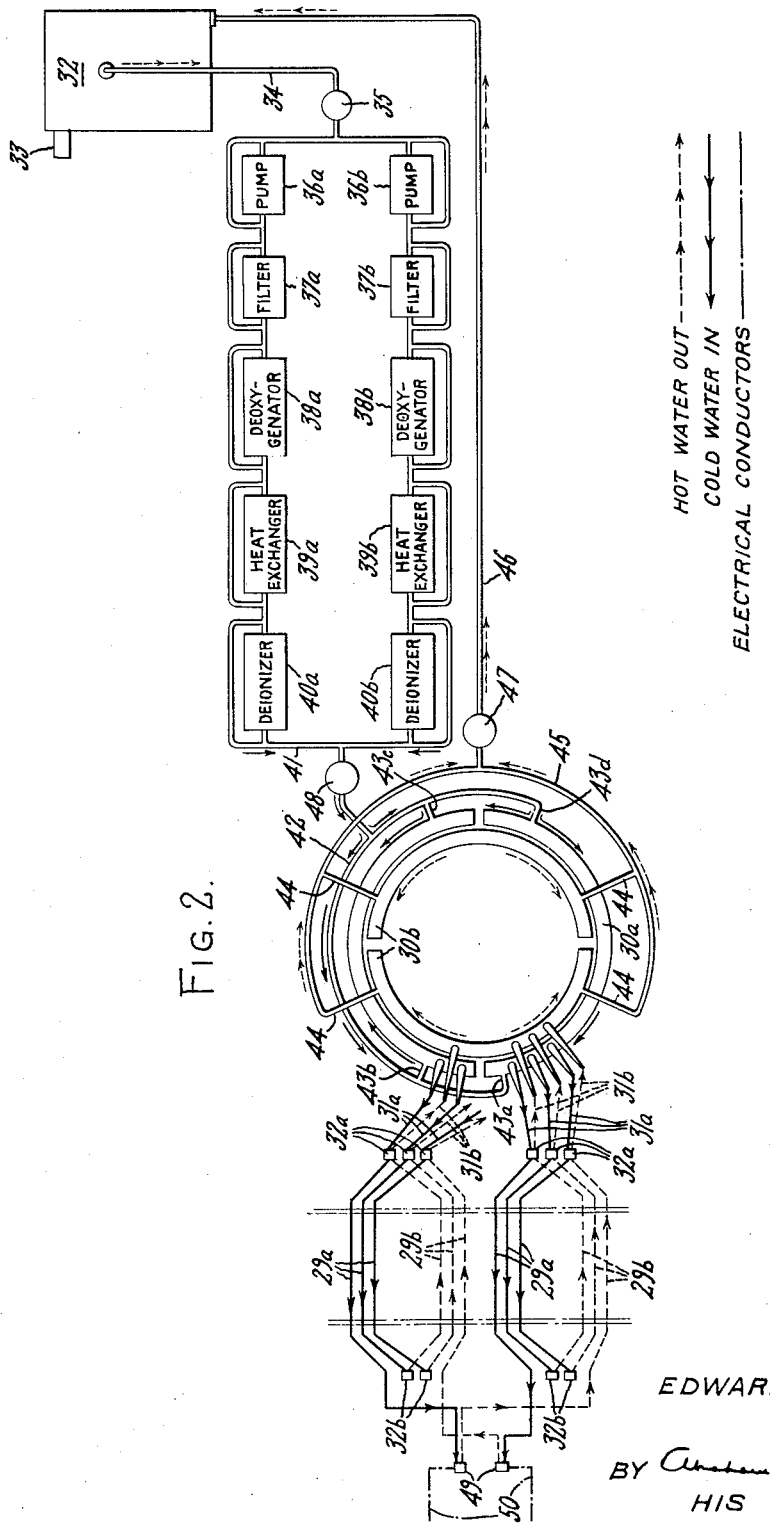

United States Patent Office 2,999,951
Patented Sept. 12, 1961

2,999,951
DYNAMOELECTRIC MACHINE COOLING
Edward J. Flynn, Schenectady, N.Y., assignor to General Electric Company, a corporation of New York
Filed Feb. 26, 1957, Ser. No. 642,409
3 Claims. (Cl. 310—54)

This invention relates to dynamoelectric machines. More particularly it relates to dynomoelectric machines, the stators of which are cooled with water.

Generally, large turbine-generators have a stationary annular armature or stator with longitudinally extending slots containing an armature winding in which is induced an alternating current output when a suitable exciting current produces a magnetic field in a rotor or core member having longitudinally extending slots containing a field winding. As the stator and rotor windings increase in axial length, it becomes more and more difficult to cool the windings by conventional ventilating systems. Thus, a limiting factor affecting the output of such large turbine generators is the temperature rise of the copper conductors making up the windings. It has previously been proposed that the most effective cooling for the windings may be obtained by circulating a suitable coolant fluid in close heat transfer relation with the metal of the current-carrying conductors, that is, with the coolant fluid passage disposed within the main ground insulation which electrically separates the copper conductor from the stator laminations. The increased effectiveness of such a cooling system is due to the fact that the heat generated in the conductors need not pass through an electrical insulating material which is also a fairly good thermal insulator. There is thus less possibility of deterioration of the dielectric characteristics of the insulation because of high temperatures to which it would otherwise be subjected.

It is known to cool at stators of such A.-C. machines by means of cooling gases such as air or hydrogen as described, for example, in Patent 2,695,368, Kilbourne, assigned to the same assignee as the present invention. In this patent a cooling system for turbine generators is also set forth for the use of liquid such as askarels, petroleum products, or more specifically transil oil, organopolysiloxane fluids, fluorocarbons and the like. In general, the synthetic materials suc has askarels, fluorocarbons and organopolysiloxanes, while nonconductors of electricity and possessed of good thermal conductivity and physical and chemical stability, as well as non-flammability, are expensive. Consequently, oil such as transil oil has been extensively used because of its low initial cost and desirable thermal capacity. However, elaborate precautions must be taken to insure that the oil is adequately confined because of its inflammability and its solvent effect on the usual conductor bar insulating materials. Means to defoam oils which have a tendency to foam must also be provided. Such oil, further, also tends, after a period of exposure to the operating temperature of the machine, to sludge and constrict or even block the coolant passages through the conductor bars unless special precautions are taken. The above cited Kilbourne patent also suggests the use as a liquid coolant for electric windings of such machines of distilled water having a corrosion inhibitor incorporated therein. Water is a very desirable, substantially non-foaming coolant liquid that is non-inflammable and upon any leakage would have little or no solvent effect on bar insulation. Furthermore, it is readily available and inexpensive and is up to five times or more as efficient as oil as a heat exchange medium. Its relatively high surface tension also makes it less likely to leak than oil. While water is somewhat volatile under ordinary atmospheric conditions, it is essentially nonvolatile under readily maintained pressures of 30 to 40 lbs. per sq. in. gauge at temperatures of the order of 80° C. to 90° C. such as are ordinarily experienced in large steam turbine generators.

A major disadvantage of distilled water as a coolant for dynamoelectric machines even when used with a corrosion inhibitor is the fact that it tends to pick up metallic ions from the bars through which it flows. Many corrosion inhibitors also make the water conductive. The presence of such electrically conductive ions in the coolant in turn makes necessary the use of excessively long electrically insulating inlet and outlet fluid connections to the windings of the machine to reduce electrical creepage at these points and the losses attendant thereto.

A principal object of this invention is to provide means and methods for cooling the stator windings of large dynamoelectric machines with water.

Another object of the invention is to provide such machines, the stator windings of which are cooled with specially treated water.

Briefly, the invention comprises a dynamoelectric machine of the general type described having means for water cooling the stator windings thereof and having associated therewith means for deoxygenating and deionizing the water coolant whereby its resistivity and corrosiveness are maintained at such level that electrical power losses due to the presence of the water are reduced.

Figure 3:
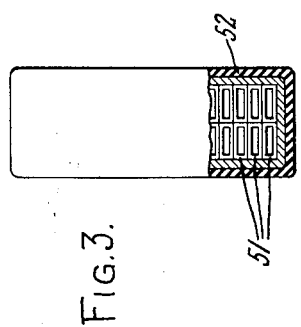

These features of the invention which are believed to be novel are set forth with particularity in the claims appended hereto. The invention along with its method of operation will, however, be better understood from a consideration of the following description and the drawing in which FIG. 1 is a longitudinal sectional view of a typical machine embodying the invention. FIG. 2 shows a typical water coolant circuit according to the invention and FIG. 3 is a cross-sectional view of a typical water cooled conductor bar array.

Referring to FIG. 1, there is shown a portion of an electrodynamic machine, the stator of which is adapted to be water cooled according to the invention. The rotor 1 mounted on shaft 2 is of the usual type and is adapted to be gas cooled or ventilated in any well known manner. Typical rotor cooling systems are shown in Patent 2,695,368, Kilbourne, assigned to the same assignee as this invention. In such a system the machine is provided with a gas-tight outer shield or housing 3 and is filled with a gas such as hydrogen under a suitable pressure of typically about 30 to 40 lbs. per sq. in. gauge. Contained within housing 3 are heat exchangers 4a and 4b for removing heat from the coolant gas. Pumping means for the gas is provided, such as low pressure fan 5 and high pressure fan 6 mounted at opposite ends of shaft 2. Suitable baffles as shown direct the cooling gas in the path of the arrows with high pressure fan 6 pumping the gas through heat exchanger 4a to a plenum chamber 7 whence a portion of the gas flows to the ends of the rotor cooling passages indicated by arrows 8. Another portion of the coolant flows through duct 9 to a second plenum chamber 10, and thence to rotor cooling passages as indicated by arrow 11. The coolant which enters the rotor cooling passages flows outwardly through suitable passages in the laminated stator 12 as indicated by arrows 13 into chambers 14 and 15. From these chambers the gas passes through conduits such as 16 and 17 to a central annular chamber 18.

Low pressure fan 5 receives its cooling gas from heat exchanger 4b and discharges it through axially disposed conduits 19 and 20 to annular chambers 21 and 22 at either end of the hot gas collecting chamber 18. From chambers 21 and 22, the gas flows inwardly through the stator member as indicated by arrows 23 and 24, thence through the gap between the rotor and stator and through the rotor cooling passages as at 25 and 26. The gas then flows outwardly through the stator as indicated by arrows 27 and 28 to collecting chamber 18 and then through heat exchanger 4b. The particular system of cooling described above is exemplary only of many such cooling systems for rotors which are well known to those skilled in the art and is set forth here only as a typical rotor cooling system which can be employed in conjunction with the present invention relating to the water cooling of stators for such machines.

The stator conductor 29 made up of conductor bars 29a and 29b have provision therein for the passage of fluid or more specifically water. The coolant water can typically be circulated through headers 30a, 30b, 30c and 30d. Headers 30c and 30d are shown in dotted lines since only two headers are actually required. Liquid flows as indicated by the arrows through header 30a and out through header 30b. Alternatively, the coolant can enter at header 30a and exit through header 30d with counterflow coolants entering header 30c and leaving header 30b. Also, the coolant can enter both headers 30a and 30b and exit through headers 30c and 30d. The headers are connected to the conductor bars by means of insulating conduits 31a, 31b, 31c and 31d, and at fittings 32a and 32b. These insulating conduits can be made of any insulating materials such as synthetic rubbers or natural rubber or plastics or resinous material. Conduits made of materials such as polytetrafluoroethylene and trifluorochloroethylene and variants thereof are preferred because, in addition to their good electrical insulating characteristics, they resist the collection of foreign matter thereon because of their generally nonadherent quality.

Referring to FIG. 2, there is shown a schematic diagram showing the flow of water through the machine and the water treating system. Water is stored in reservoir 32. This water can come from any source desired. For example, it can come from makeup water from the steam turbine with which the electrodynamic machine may be associated. It can also come from the condensed steam of the turbine or from any other convenient source, the amount of purification necessary, of course, depending on this source. Reservoir 32 can conveniently be provided with a level indicating device 33 of usual design which can serve as a leak detector for the water cooling system. From reservoir 32 the water passes through conduit 34 which can be provided with a resistivity meter 35 to indicate the initial resistivity of the coolant. Downstream of coolant conduit 34, a two-branched water treating system is arranged as shown, each branch having identical units so that one branch may be shut down for repairs without interrupting the coolant flow. Valves, not shown for the sake of simplicity, are provided to transfer water through the system as desired. There are provided in the respective water treating branches pumps 36a and 36b, filters 37a and 37b, deoxygenators 38a and 38b, heat exchangers 39a and 39b and deionizers 40a and 40b. It will be noted that provisions is also made for by-passing each treating element in each treating branch by means of conduits shown by means of valves which are not shown when conditions indicate that the operation of the particular element such as the deionizer or deoxygenator is not needed for a period of time. While the water treating elements have been shown in a particular upstream-downstream arrangement, it will be appreciated that this order can be changed as desired in many cases with the deionizer being preferably in the downstream position and the deoxygenator next upstream. By this particular arrangement, there is less chance of the water being entrained with gas such as air, as it enters the conductor bars and the deionizer will act to remove any impurities picked up in the rest of the system so that only pure, high resistivity water enters the machine. The pumps 36a and 36b, as well as filters 37a and 37b, are of the usual type, the latter being utilized to remove filterable particles or materials from the water. In some cases where the entrant water is substantially free of foreign particulate matter, the filters may be dispensed with or used only part of the time. Deoxygenators 38a and 38b include means for deoxygenating the water. Suitable deoxygenators are well known to those skilled in the art and are described in Water Conditioning for Industry, Powell, McGraw-Hill, New York, 1954, and elsewhere in the literature. While deoxygenators using mechanical and thermal means to accomplish their purpose can be used satisfactorily, it is preferred to use chemical deoxygenators because of their reduced bulk, simplicity of operation and relatively simple maintenance. Anion exchange resins are preferred for deoxygenation purposes. Typical of such anion resins are those containing amino and quaternary nitrogen produced by condensing formaldehyde with aromatic amines, such as aniline, m-ethylamino benzene, etc., as disclosed in Patent 2,151,883; melamine-formaldehyde-guanidine resins, phenol formaldehyde-polyamine resins, acetone-formaldehyde-polyamine resins and the resins described in Patent 2,366,008, assigned to the same assignee as this invention. These materials are complexed with copper or some similar metal, the reduction of the copper or other metal producing a material capable of reacting with oxygen. Duolite S–10 manufactured by the Chemical Process Company is such a material. Heat exchangers 39a and 39b may also be of any of the usual types.

The deionizers 40a and 40b can be of the cartridge or any other suitable type containing a mixture of anion and cation exchange materials. While these can be any of the natural and artificial materials known to demineralize water, including zeolites, it is preferred from the standpoint of convenience to use ion exchange resins. Examples of the anion type exchange resins have been given above. Exemplary of the cation exchange resins containing as active agents sulfonic, carboxylic, phosphonic and phenolic hydroxyl groups are polyhydric phenol-formaldehyde resins described in Patent 2,104,501, sulfited tannin-formaldehyde resins described in Patent 2,191,853, sulphonic type phenol formaldehyde resins such as Amberlite IR–100 (Rohm and Haas Company), Duolite C–3 and C–10 (Chemical Process Company), sulphonated cross-linked polystyrene copolymers such as Duolite C–20 (Chemical Process Company), Permutit Q (Permutit Company) and Amberlite IR–120 (Rohm and Haas Company). Carboxylic acid-type cation exchange resins are available as Duolite CS–101 (Chemical Process Company), Permutit H70 (Permutit Company) and Amberlite IRC–50 (Rohm and Haas Company) while phosphonic acid cation exchange materials are available as Duolite C–61 (Chemical Process Company) and Permutit XP (Permutit Company) Patents 2,340,110; 2,340,111; 2,373,574; and 2,373,548 assigned to the same assignee as this invention also relate to cation exchange resins.

It is preferred to use mixed beds of cation and anion exchange materials so that both types of ions can be removed from the water simultaneously. However, where the initial purity of the water is high, beds of cation and anion exchange materials arranged in series are suitable.

The deionized or purified water passes through conduit 41 to a semi-annular header 42 and thence through branch pipes 43a, 43b, 43c and 43d to annular header 30a. Fluid conduits 31a, 31b, 31c and 31d serve to conduct the fluid to conductor bars 29a and 29b through connectors 32a. In the diagram the cool liquid is represented by solid lines, no attempt being made to represent detailed electrical connections but primarily the fluid flow, and the spent or heated liquid flow is represented by dotted lines. Fittings 32b corresponding to fittings 32a serve to make both liquid and electrical connections between pairs of connected conductors. Such fittings are described, for example, in Patent 2,695,368 above cited and elsewhere. The spent cooling fluid represented by the dotted lines leaves the bar end fittings 32a through separate conduits represented by 31b and thence to segmental annular header 30b. Branch conduits 44 connect with discharge header 45 which returns the coolant to reservoir 32 through conduit 46. An additional resistivity meter 47 may be provided in conduit 46 as well as another meter of the same type 48 in inlet conduit 41. A fitting 49 is provided where electrical leads 50 are connected from the stator winding to the external circuits. Such fittings are described, for example, in the above-cited Patent 2,695,368.

It will be understood, of course, that the particular example of the dynamoelectric machine along with its electrical connections set forth above is not to be taken as limiting in any way, the present invention relating to a means for effectively cooling such a machine with water treated in the special manner set forth.

Shown in FIG. 3 is a partial cross-sectional view of a typical conductor bar construction. The bar comprises rows of hollow wires 51, each wire being insulated from adjacent wires by suitable insulating material. The entire array is encased in heavy ground insulation 52 to form conductors such as 29a and 29b. Though not as efficient, coolant passages can be alternatively provided within the conductor bar array but external of the conductors themselves.

It has been found that when water is treated as described herein, its resistivity is such that it can be used as an efficient cooling medium for electrodynamic machines. This is contrasted with the use of even carefully distilled water which at the operating temperature of about 80° C. of such machinery has an initial resistivity of about $5 \times 10^5$ ohm-cm., which initial resistivity lowers as the water passes through the metal conduits such as the copper conductor bars, etc. For efficient operation of turbine-generators operating at voltages of 5,000 volts and upward and using inlet and outlet tubes of insulating material, the resistivity of the water preferably should be kept at a constant value of at least $2 \times 10^5$ ohm-centimeters to prevent excessive creepage losses along the inlet and outlet tubes. Using the present invention, a water coolant resistivity of at least $1.7 \times 10^6$ ohm-cm. can be constantly maintained at 80° C. with full circulation through the deoxygenator and deionizer. When the deionizers are cut out, the resistivity drops to about $10^6$ ohm-cm. in about 7 hours. A constant resistivity at 25° C. of $10^6$ ohm-cm. can be maintained, for example, by by-passing about ⅛ of the water flow past the deionizers. The effect of the deoxygenator is illustrated by the fact that with the deoxygenator cut out, the resistivity falls to about $1.3 \times 10^6$ ohm-cm. from a value of $1.7 \times 10^6$ ohm-cm., again at 80° C. In some cases the oxygen content of the water may be so low that the use of the deoxygenator can be dispensed with at least a part of the time. It will be realized, of course, that the length of the inlet and outlet insulating tubes can be varied, keeping in mind that their length must be correlated with the creepage loss limit desired for the particular machine. Those skilled in the art can readily arrive at the design requirement for any particular machine and any loss. For installations where low temperatures are encountered, anti-freeze materials such as ethylene glycol and the like can be used. As much as 50% by volume of ethylene glycol in the water coolant has been used without deleterious effect.

In operation, the water coolant is preferably kept under a pressure of from about 35 to 40 lbs. per sq. in. gauge. This is more than sufficient to prevent evaporation of the water at operating temperatures of the order of 80° C. Of course, higher pressures can be used. Effective control over the system can be maintained very readily.

Leaks are indicated by the reservoir level indicator 33 which can be adapted to give an audible or visual alarm or to actuate shut-down controls. Resistivity meters 35, 47 and 48 permit ready checking of the resistivity of the coolant at the various points in the system and, of course, additional meters can be placed wherever desired in the flow path. The resistivity meters can also be adapted in well-known manner to actuate alarms when the resistivity falls below any chosen value or even shut the machine down completely as desired. For example, in an 18,000 volt turbine generator of 290,000 kva. output having ninety-six water inlet and outlet tubes twenty-two inches in length and one-half inch inside diameter, at normal operation at about 90° C. with an acceptable creepage loss of 0.2 kw. across the tubes, the resistivity of the water coolant should be about $4.0 \times 10^5$ ohm-cm. An initial alarm can conveniently be set to provide an audible or visual signal when the resistivity falls to about $1.2 \times 10^5$ ohm-cm. The resistivity meter can also be set to completely shut down the machine when a resistivity of about $2.5 \times 10^4$ ohm-cm. is reached. It will be realized that the above is exemplary only of actual systems and controls which can be used.

If the coolant system is operated with the water by-passing one or more elements of the treating system, such as the deoxygenator or deionizer, the lowering of the resistivity to a certain limiting value as registered on any resistivity meter can be used to actuate or bring into the system once more the proper treating elements until the resistivity and purity have returned to a satisfactory level.

There is provided by the present invention means and method for making possible the cooling of dynamoelectric stators by means of water without excessive corrosion of the system and with constant maintenance of such high resistivity and purity in the coolant that losses can be held to a suitable minimum. The use of pure, high resistivity water as described permits immediate and continued operation of generators, such as those described with efficient cooling and minimum loss.

What I claim is new and desire to secure by Letters Patent of the United States is:

1. In a dynamoelectric machine having a rotor member, a stator member and housing, means for the water cooling of said stator member, said means comprising conduit means within the conductor bars of said stator, connected in electrically insulating manner to means for maintaining the resistivity of the water coolant at a desirable level, said means comprising means for deoxygenating and deionizing said water.

2. In a conductor-cooled electrodynamic machine having a closed liquid-cooling circuit for removing heat from the electrical windings thereof including a recirculating circuit associated with said machine for passing spent coolant from ducts within said windings and returning it to the inlet thereof, means for deionizing said liquid coolant, heat exchanger means for removing heat from the coolant in said recirculating circuit, and means for circulating coolant through the recirculating circuit to and from the windings and maintaining a preselected minimum pressure adequate to insure that the coolant will remain in the liquid phase in all portions of the windings.

3. The method of cooling a conductor-cooled electrodynamic machine having a closed fluid coolant circuit passing through ducts in the windings for removing heat from the windings thereof, which method comprises circulating deionized water through the winding cooling ducts, removing heat from the spent coolant fluid discharged from the winding circuits, and supplying coolant fluid to the inlets of said winding circuits at a pressure such that the minimum pressure in all portions of the winding circuits is substantially above the vaporization pressure of the liquid.

(References on following page)

References Cited in the file of this patent

UNITED STATES PATENTS

| | | |
|---|---|---|
| 2,381,122 | Fechheimer | Aug. 7, 1945 |
| 2,618,756 | Fechheimer | Nov. 18, 1952 |
| 2,727,161 | Kilner | Dec. 13, 1955 |

OTHER REFERENCES

Liquid Cooling of A.C. Turbine Generators by Carl Fechheimer, A.I.E.E. Paper 47–95, December 1946, pages 15, 16 and 19.

Liquid Cooling of A.C. Turbine Generators by Carl Fechheimer, A.I.E.E. Technical Paper 47–95, December 1946, page 13.

Advances in Design of Large Turbine Generators, Power Engineering, vol. 57, No. 8, 1953, page 98.

Liquid Cooling of A.C. Turbine Generators by Carl Fechheimer, A.I.E.E. Technical Paper 47–95, December 1946, page 10.